United States Patent [19]

Hirose et al.

[11] 4,365,587
[45] Dec. 28, 1982

[54] APPARATUS FOR FORMING ORGANIC POLYMER THIN FILMS UTILIZING MICROWAVE INDUCED PLASMAS

[75] Inventors: Masahiko Hirose, Tokyo; Yoshimi Akai, Yokohama, both of Japan

[73] Assignee: Tokyo Shibaura Denki Kabushiki Kaisha, Kawasaki, Japan

[21] Appl. No.: 191,242

[22] PCT Filed: Jul. 25, 1979

[86] PCT No.: PCT/JP79/00193

§ 371 Date: Mar. 24, 1980

§ 102(e) Date: Mar. 24, 1980

[87] PCT Pub. No.: WO80/00346

PCT Pub. Date: Mar. 6, 1980

[30] Foreign Application Priority Data

Jul. 25, 1978 [JP] Japan .................................. 53-89972

[51] Int. Cl.³ .................................................. C08F 2/52
[52] U.S. Cl. ...................................... 118/723; 427/41; 118/719; 204/170
[58] Field of Search .......................... 427/41, 39, 45.1; 204/170, 168, 165; 118/715, 723, 719, 50.1, 722

[56] References Cited

U.S. PATENT DOCUMENTS 3,518,108 6/1970 Heiss, Jr. et al. ..................... 427/41
4,138,306 2/1979 Niwa ................................. 427/39 X

OTHER PUBLICATIONS

Brodsky et al., "Method of Preparing Hydrogenated Amorphous Silicon", *I.B.M. Tech. Disclosure Bull.*, vol. 22, #8A, Jan., 1980.

Streitwieser, Jr. et al., "Organic Compds. in Microwave Discharge, II, Intral Studies with Toluene and Related Hydrocarbons", *Journal of The American Chem. Soc.*, vol. 85, No. 5, Mar. 5, 1963.

*Primary Examiner*—John D. Smith
*Assistant Examiner*—Bernard F. Plantz
*Attorney, Agent, or Firm*—Oblon, Fisher, Spivak, McClelland & Maier

[57] ABSTRACT

An apparatus for forming a thin organic film on a substrate which includes a reaction chamber for receiving a substrate on which a thin organic film is to be formed; a microwave discharge tube for supplying the reaction chamber with a carrier gas activated by microwave discharge; a microwave-generating mechanism provided with a hollow resonator for a microwave discharge; and a mechanism for supplying a carrier gas to the microwave discharge tube and a mechanism for supplying the reaction chamber with an organic compound monomer to be polymerized. That region of the microwave discharge tube where a plasma is produced by discharge does not extend to the reaction chamber, but is completely separated therefrom.

6 Claims, 1 Drawing Figure

APPARATUS FOR FORMING ORGANIC POLYMER THIN FILMS UTILIZING MICROWAVE INDUCED PLASMAS

FIELD OF THE INVENTION

This invention relates to an apparatus which polymerizes a organic compound monomer by utilizing a plasma to produce a thin film of an organic polymer on a substrate.

DESCRIPTION OF THE PRIOR ART

Studies are being made to form a thin film of an organic polymer on a substrate prepared from, for example, glass and utilize the substrate thus treated as a photosenser, heat senser or optical filter.

Hitherto, the formation of a thin film of an organic compound based on plasma polymerization has been carried out as follows. First, a substrate is placed in a sealed vessel, and then a vapor of an organic compound monomer is introduced into the sealed vessel. Electric energy is supplied to the interior of the sealed vessel through an electrode or coil set inside or outside of the sealed vessel. A vapor of an organic compound monomer is electrically discharged to convert it into a plasma. Electric energy applied at this time has a high frequency of scores of MHz, for example, 13.56 MHz, or a commercial frequency or a direct current. A organic polymer formed in the plasma of the organic compound monomer thus produced is deposited on the substrate. Alternatively, an organic compound monomer adsorbed to the surface of the substrate is polymerized by the impingement of ions or electrons included in the plasma of the organic compound monomer. Thus, a thin organic film is settled on the substrate. The process is also known which introduces an organic compound monomer and any other gas jointly into the sealed vessel in order to control a pressure condition. With all the conventional thin organic film-producing methods including said process of jointly supplying an organic compound monomer and any other gas, a substrate is disposed in a region in which a plasma is produced by electric discharge and consequently is directly exposed to a plasma produced in said region.

Any of the above-mentioned conventional thin organic film-producing methods and apparatuses have the following drawbacks. First, a substrate on which a thin organic film is to be deposited is placed in a plasma-producing region, that is, the region in which an organic compound monomer is converted into a plasma by electric discharge. Therefore, a thin film of an organic polymer deposited on the substrate tends to be decomposed or degraded under the impingement of ions and electrons included in the plasma. As a result, a decline takes place in the speed at which a thin film of an organic polymer might be completely formed, were it not for such drawbacks. Secondly, where an electric power source having a high frequency of less than scores of MHz, for example, 13.56 MHz, is applied, difficulties arise in matching a high frequency produced by a high frequency oscillator with the high frequency of electric energy required for the production of a plasma. Further, a high frequency energy undergoes a large radiation loss in that region of a discharge tube where discharge takes place. Therefore, a high frequency energy fails to be efficiently supplied to the plasma of an organic compound monomer, resulting in a decline in the generation of radicals in an organic compound monomer as compared with an amount of electric power originally supplied to the plasma. The above-mentioned drawbacks also occur in the application of electric energy having a commercial frequency or direct current power. Where a large electric power is to be supplied to the plasma of an organic compound monomer, it is necessary to provide a high frequency oscillator and power source having a correspondingly large capacity. As things stand at present, however, such high frequency oscillator itself can not have a sufficiently high oscillation efficiency. Thirdly, plasma parameters such as the density and temperature of electrons are difficult to control in the formation of a thin organic film by the conventional process of high frequency discharge energy. Further with the prior art apparatus, a region of stable discharge is narrow with respect to the pressure of the vapor of particularly an organic compound monomer or any other gas, readily giving rise to unstable discharge. Moreover, at the discharge of electric energy having a high frequency of less than scores of MHz or a commercial frequency or direct current power, an organic compound monomer is converted into a plasma in a broader region than necessary, also presenting difficulties in controlling the formation of an organic thin film. As described above, the conventional method presents difficulties in forming a thin film of an organic polymer, particularly in controlling the speed at which said organic polymer film is produced.

SUMMARY OF THE INVENTION

It is accordingly an object of this invention to provide a thin organic film-producing apparatus based on the microwaves discharge.

Another object of the invention is to provide a thin organic film-producing apparatus, which efficiently forms a thin organic film on a substrate and, prevents said thin organic film, once formed, from being decomposed or degraded under the impingement of ions or electrons included in a plasma of an organic compound monomer.

This invention provides an apparatus for producing a thin film of an organic polymer on a substrate, which including:

(1) a microwave-generating mechanism;
(2) a hollow resonator connected to the microwave-generating mechanism;
(3) a microwave discharge tube which is inserted into the hollow resonator to produce a microwave plasma therein;
(4) a feeding assembly which is connected to one end of the microwave discharge tube to supply a plasma generating carrier gas into the microwave discharge tube;
(5) a reaction chamber which is connected to the other end of the microwave discharge tube for communication with the interior thereof and spaced from that region of the microwave discharge tube in which a plasma is formed; and
(6) an evacuating mechanism connected to the reaction chamber, and a mechanism connected to the reaction chamber to supply thereto a vapor of an organic compound monomer which is to be polymerized.

With the above-mentioned thin organic film-producing apparatus of this invention, a plasma of the carrier gas is formed and activated by the microwave discharge. The activated carrier gas plasma is brought into the reaction chamber to contact an organic compound monomer injected in the reaction chamber. In other words, a vapor of an organic compound monomer which is to be polymerized is not directly subjected to electric discharge. But a discharge energy is transmitted to the vapor by means of the carrier gas activated by the microwave discharge. Where, therefore, the carrier gas plasma ceases to be supplied to the reaction chamber, the polymerization of an organic compound monomer is stopped, thereby preventing a thin organic film from being produced on the substrate.

With a thin organic film-producing apparatus embodying this invention, that region of the microwave discharge tube in which a plasma of a carrier gas is formed does not extend to the reaction chamber. Namely, the plasma-forming region and reaction chamber are completely separated from each other. Therefore a thin organic film, once formed on the substrate, does not undergo the impingement of ions and electrons included in the plasma. Consequently, a thin organic film produced is little subject to decomposition or degradation, eventually accelerating the speed at which the thin organic film is formed. Further, since the microwave discharge is applied, electric energy is efficiently transmitted to a plasma. Moreover, the plasma-forming region of the microwave discharge tube does not extend to the reaction chamber, thereby offering the advantage of substantially controlling the speed at which a thin organic film is produced by regulating the supply of the carrier gas.

BRIEF DESCRIPTION OF THE FIGURES

Various other objects, features and attendant advantages of the present invention will be more fully appreciated as the same becomes better understood from the following detailed description when considered in connection with the accompanying drawings in which like reference characters designate like or corresponding parts through the several views and wherein.

DETAILED DESCRIPTION OF THE PREFERRED EMBODIMENTS

Figure 1:
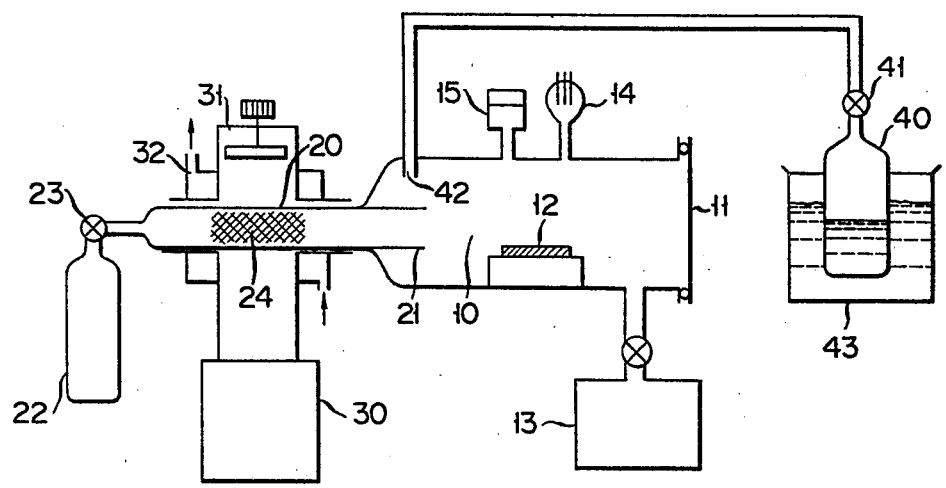
FIG. 1 is a schematic sectional view of a thin organic film-producing apparatus according to a preferred embodiment of this invention.

Best Mode of Carrying Out the Invention

This invention is described in greater detail with reference to the accompanying drawing.

A thin organic film-producing apparatus embodying this invention includes a reaction chamber 10 and a microwave discharge tube 20 spaced from said reaction chamber 10. The insertion of a substrate 12 into the reaction chamber 10 and the withdrawal of the substrate 12 therefrom are carried out by opening a lid 11. A microwave discharge tube 20 is formed of a quartz tube having a smaller diameter than the reaction chamber 10. The open end portion 21 of the microwave discharge tube 20 is inserted into the reaction chamber 10. The whole of a system constituted by the reaction chamber 10 and microwave discharge tube 20 is evacuated by an evacuating mechanism 13. The evacuating mechanism may be of the ordinary type such as a diffusion pump or rotary pump. The degree to which said system is evacuated is measured by an ionization vacuum gauge 14. The other end of the microwave discharge tube 20 is connected to a carrier gas cylinder 22. A carrier gas is supplied from the cylinder 22 to the microwave discharge tube 20 through a valve 23. The carrier gas may be formed of any of the rare gases such as helium, neon and argon or nitrogen gas or hydrogen gas. An organic compound monomer used as the raw material of a thin organic film is held in a vessel 40. This organic compound monomer is conducted in the form of vapor through a valve 41 to the reaction chamber 10 at an inlet 42. The vapor of said organic compound monomer can be produced by the ordinary heating mechanisms. With the embodiment of this invention, however, the vapor of the organic compound monomer is produced by placing the vessel 40 of an organic compound monomer in a thermostat 43 whose temperature is controlled. The pressure of the carrier gas and the vapor of the organic compound monomer is measured by a diaphragm pressure gage 15. The pressure of the carrier gas and the vapor of the organic compound monomer can be respectively controlled by a pressure regulator and a leak valve (not shown).

Any organic compound monomer can be used in this invention without restriction, provided it has hitherto been applied in the formation of a thin organic film. However, particularly preferred organic compound monomers are ethylene, propylene and styrene.

The microwave-generating assembly 30 used in this invention may be of the conventional type, for example, a magnetron. The microwave discharge tube 20 crosswise penetrates a hollow resonator 31 of the microwave-generating assembly 30, causing a carrier gas conducted through the discharge tube 20 to be discharged by microwave energy for activation. That portion of the hollow resonator 31 which is penetrated by the microwave discharge tube 20 is covered with the ordinary cooling assembly 32 to expel radiant heat resulting from microwave discharge. A carrier gas activated by a plasma produced in the plasma-forming region 24 of the microwave discharge tube 20 is continuously brought into the reaction chamber 10 to polymerize an organic compound monomer introduced into the reaction chamber 10 at an inlet 42. The open end of the microwave discharge tube 20 should preferably be disposed in the reaction chamber 10 at a point nearer to the substrate 12 than the inlet 42 of the organic compound monomer.

Description is now given the operation of a thin organic film-forming apparatus embodying this invention. First, the lid 11 is opened to place to substrate 12 made of, for example, glass in the reaction chamber 10. Thereafter, the lid 11 is closed to seal the system including the reaction chamber 10 and microwave discharge tube 20. Thereafter, the sealed system is evacuated to a pressure of about $10^{-6}$ Torr by a diffusion pump received in the evacuation assembly 13 to remove, for example, gases remaining in the system. After the diffusion pump is stopped, the valve 23 is opened, and a rotary pump set in the evacuation assembly 13 is actuated. As a result, an argon gas is continuously supplied from a gas cylinder 22 to the microwave discharge tube 20 at a fixed pressure of, for example, about 1 Torr. On the other hand, a vapor of styrene volatilized by the thermostat 43 is continuously brought into the reaction chamber 10 at the inlet 42 by opening the valve 41 at a lower pressure of, for example, about 0.5 Torr than the pressure of the argon gas. The argon gas supplied to the microwave discharge tube 20 is discharged by the energy of microwaves emitted from a magnetron at a frequency of 2450 MHz with an output of 400 W, and is converted into a plasma. As a result, the argon gas is continuously supplied to the reaction chamber 10 in the form of an activated gas. The activated gas of the argon gas and a vapor of styrene are mixed in the reaction chamber 10. The internal energy of the activated gas of the argon gas is transmitted to the vapor of styrene. Accordingly, the styrene is polymerized and deposited on the glass substrate 12 in the form of a thin film.

Where, in the above-mentioned example of this invention, the styrene was polymerized for about 20 minutes, then a thin light brown film of a styrene polymer was deposited on the glass substrate 12 with a thickness of about 1.2 microns. A thin film of styrene polymer thus produced has better properties than the conventional polystyrene in various respects. This thin styrene polymer film is shown to have a specific gravity of about 1.12 and be highly cross-linked. The thin styrene polymer is insoluble even in a solvent such as toluene, and has far higher resistance to chemicals and heat and more excellent electric insulation than the ordinary polystyrene.

The process by which a thin organic film is formed on a substrate is not yet accurately defined, but is believed to be carried out as follows. An activated carrier gas such as an argon and nitrogen collides with a vapor of a monomer of an organic compound such as styrene. At this time, the electric energy of the activated carrier gas is transmitted to the monomer of, for example, styrene. With the energized styrene monomer, the double bond and benzene nucleus are opened to form radicals. These radicals collide with each other to give rise to polymerization, causing a thin film to be deposited on a substrate. Another assumption is that an activated carrier gas impinges on an organic compound monomer adsorbed to the surface of a substrate, causing the monomer to be polymerized on said surface. The energy required for the polymerization of the organic compound monomer is transported by the carrier gas, thereby preventing the organic compound monomer from being directly discharged. Where, therefore, the carrier gas ceases to be supplied, then the polymerization of the organic compound monomer is brought to an end.

With a thin organic film-forming apparatus embodying this invention, a substrate on which a thin organic film is deposited is set apart from a region in which a plasma is formed, and saved from the impingement of high energy ions and electrons included in a plasma. Therefore, a uniform flawless thin organic film can be produced on the substrate without decomposition or deterioration. As compared with the conventional high frequency oscillator, the high frequency of a microwave oscillator used in this invention better matches with that of electric energy required for the conversion of an organic compound monomer into a plasma, enabling high frequency energy to be efficiently transmitted to a plasma. Consequently, a carrier gas activated by the microwave discharge has a sufficiently long effective life to transmit electric energy to a reaction chamber disposed remotely from a microwave discharge tube. A microwave oscillator used in this invention which may be well served by a commercially available magnetron for a microwave oven can be procured at low cost and handled with ease. The microwave osillator for an electron range which is provided with a hollow resonator minimizes the radiation loss of electromagnetic waves, enabling electric energy to be efficiently transmitted to a plasma. The thin organic film-forming apparatus of this invention has the advantages that electric energy can be efficiently transmitted to a plasma; an activated carrier gas has a long effective life; once formed, a thin organic film is not subject to decomposition or deterioration; the thin organic film is formed faster than in the past; the formation of the thin organic film can be easily controlled; and the remote placement of a reaction chamber from a microwave discharge tube prevents an organic polymer from being deposited on the inner wall of the microwave discharge tube, ensuring the continuous operation of the subject apparatus and consequently offering prominent industrical merits.

A thin organic film-forming apparatus embodying this invention is applicable to the manufacture of various types of optical filter, photosenser and heat senser.

Obviously, numerous modificatons and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for forming a thin organic film upon a substrate by means of a plasma comprising:
   means for generating microwaves;
   a resonator having a hollow interior portion and connected to said microwave generating means;
   a tube for discharging said microwaves disposed across and penetrating said resonator for producing a microwave plasma in a plasma forming region of said tube;
   means connected to a first end portion of said tube for introducing a plasma generating carrier gas into said tube;
   a reaction chamber connected to and communicating with a second end portion of said tube and disposed apart from said plasma forming region;
   means for evacuating said reaction chamber connected to said reaction chamber;
   means for supplying an organic compound monomer into said reaction chamber, said supplying means having an inlet for introducing said monomer into said chamber such that said monomer is polymerized;
   a substrate disposed within said chamber for supporting said polymerized monomer disposed nearer said second end portion of said tube than said inlet of said supplying means; and
   wherein said substrate is disposed downstream from said inlet and downstream from said second end portion of said tube.

2. A thin organic film-forming apparatus according to claim 1, wherein said microwave-generating means further comprises a magnetron.

3. A thin organic film-forming apparatus according to claim 1, wherein said carrier gas further comprises a rare gas.

4. A thin organic film-forming apparatus according to claim 1, further comprising means for conducting said carrier gas activated by said plasma produced in said plasma-forming region of said microwave discharge tube to said reaction chamber to contact said organic compound monomer.

5. A thin organic film-forming apparatus according to claim 1, wherein said carrier gas further comprises nitrogen gas.

6. A thin organic film-forming apparatus according to claim 1, wherein said carrier gas further comprises hydrogen gas.

* * * * *